United States Patent [19]
Phillips

[11] Patent Number: 4,516,958
[45] Date of Patent: May 14, 1985

[54] FLEXIBLE SHAFT COUPLING DEVICE

[75] Inventor: Edward H. Phillips, Middletown, Calif.

[73] Assignee: Hidden Valley Associates, Inc., Middletown, Calif.

[21] Appl. No.: 548,450

[22] Filed: Nov. 3, 1983

[51] Int. Cl.³ .......................... F16D 3/56; F16D 3/50
[52] U.S. Cl. ................... 464/153; 464/100; 464/147
[58] Field of Search ............... 464/97, 98, 100, 101, 464/147, 153–156, 160, 161; 403/57–59

[56] References Cited

U.S. PATENT DOCUMENTS

| 1,759,784 | 5/1930 | Grob | 464/147 |
| 2,088,849 | 8/1937 | Fenaille | 464/147 |
| 2,591,769 | 4/1952 | Beechler | 464/101 |
| 3,574,277 | 4/1971 | Paine | 464/100 |
| 4,033,144 | 7/1977 | Allen | 464/147 X |
| 4,285,214 | 8/1981 | Bochan | 464/101 X |

Primary Examiner—John Petrakes
Attorney, Agent, or Firm—Patrick J. Barrett

[57] ABSTRACT

A flexible coupling is provided transmitting torque and thrust loads between parallel misaligned shafts, but does not permit any nonparallel misalignment between the shafts. The coupling comprises members that are attached to the shafts, each of which has two parallel bendable arms. The arms are nested and attached to a central rigid member located between the arms.

11 Claims, 4 Drawing Figures

FLEXIBLE SHAFT COUPLING DEVICE

BACKGROUND OF THE INVENTION

1. Field of the Invention

This invention relates to devices for coupling rotating shafts with parallel misalignment, i.e. shafts that are radially displaced from each other or that move radially during rotation.

2. Prior Art

In many types of rotating machinery, misaligned rotating shafts need to be coupled together. Sometimes the misalignment also changes while the shafts rotate, thus requiring a coupling that can transmit rotational motion while accommodating varying misalignment. In some types of rotating machinery, the rotating shafts are parallel and the misalignment is radial, with the shafts moving radially with respect to each other while they rotate. An example of such machinery is a type of pump referred to as a Moineau pump described in U.S. Pat. Nos. 1,892,217; 2,028,407; 2,483,370; 2,525,265; 2,505,136; and 2,545,626.

Many different coupling devices have been used in the past to couple misaligned rotating shafts. A commonly used device known as a U-joint comprises two "U" shaped members, each attached to one of the shafts, connected by a cross-shaped member through bearings. U-joints are particularly useful when the axes of rotation of the coupled shafts are not parallel, i.e. they exhibit angular misalignment. However, U-joints have the disadvantage that the bearings wear with use and must be replaced.

Another type of flexible coupling also used for shafts that are not parallel has a pair of collars, attached to the shafts, that are coupled together by a flexible member such as a rubber tube or a cylindrical bellows. This type of coupling usually is not suitable to bear axial loads. Neither this type of coupling nor a U-joint is well suited to coupling rotating shafts that have parallel axes of rotation but are radially misaligned or move radially with respect to each other.

SUMMARY OF THE INVENTION

In accordance with the preferred embodiment of the present invention, a coupling device for two rotating shafts is provided which can transmit torque and thrust while permitting radial movement. The coupling device has a coupling member or collar at each end for coupling to the two shafts. Each collar has two parallel arms attached to it, and both arms attached to a given collar can bend about one axis that is orthogonal to the axis of rotation. The bending axis for the arms attached to one collar is orthogonal to the bending axis for the arms attached to the other collar.

The arms are attached to a central member that is situated between the arms and the collars. Torque and thrust is transmitted from one collar through the arms attached to it to the central member; and that member, in turn, transmits the torque and thrust through the other pair of arms to the other collar.

If the shafts are radially misaligned, one or both of the pairs of arms will bend to accommodate this misalignment. The coupling device is therefore ideally suited to coupling a motor drive shaft to a Moineau pump. It is preferable to make the coupling device out of a single piece of material, making it essentially maintenance free, especially compared with U-joints. This coupling device, however, will not permit nonparallel misalignment of the shafts.

DESCRIPTION OF THE PREFERRED EMBODIMENT

Figure 3:
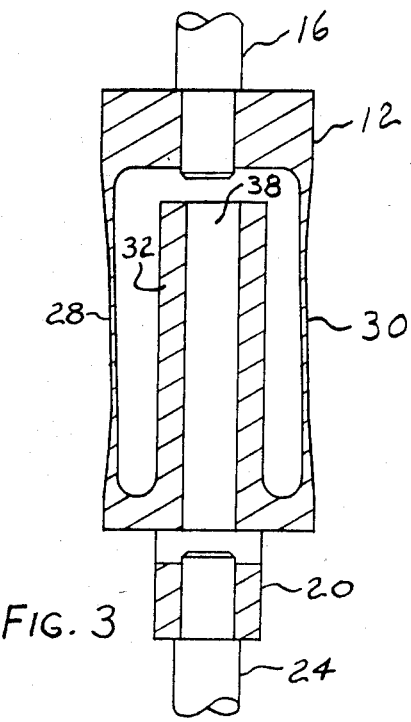
FIG. 3 is a cross sectional view of the device of FIG. 1 through a plane parallel to the axis of rotation of the device.

The Figures show a flexible shaft coupling device 10 that has a rectangular member 12 with a hole 14 for attaching the coupling device to a cylindrical shaft 16. Set screws 18 secure shaft 16 in hole 14. Another rectangular member 20 is provided with a hole 22 for attachment to a shaft 24, and set screws 26 secure shaft 24 in hole 22. Both shafts rotate about their longitudinal axes, which are essentially parallel.

Flexible arms 28 and 30 each have one end attached to opposing faces of member 12 and another end attached to a connecting member 32. Arms 28 and 30 are each flexible about an axis that is orthogonal to the axis of rotation of shaft 16 and relatively rigid about other axes. The flexibility of the arms allows member 12 to shift laterally with respect to connecting member 32, as shown in FIG. 3, with both arms bending in the same direction. Because the arms are only flexible about one axis, they effectively transmit torque and thrust from shaft 16 to connecting member 32.

Figure 4:
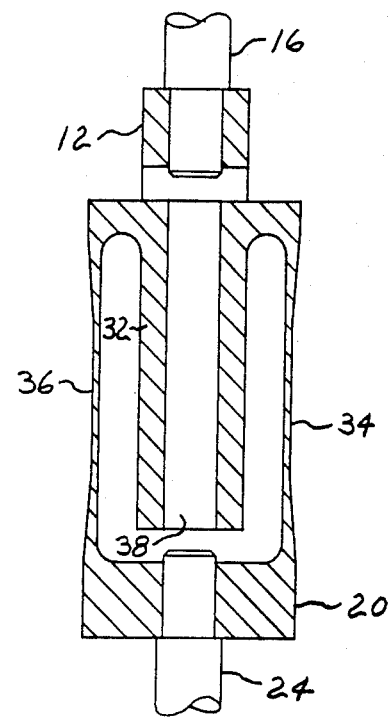
FIG. 4 is a cross sectional view of the device of FIG. 1 through a plane parallel to the axis of rotation of the device and perpendicular to the plane of view of FIG. 3.
Figure 1:
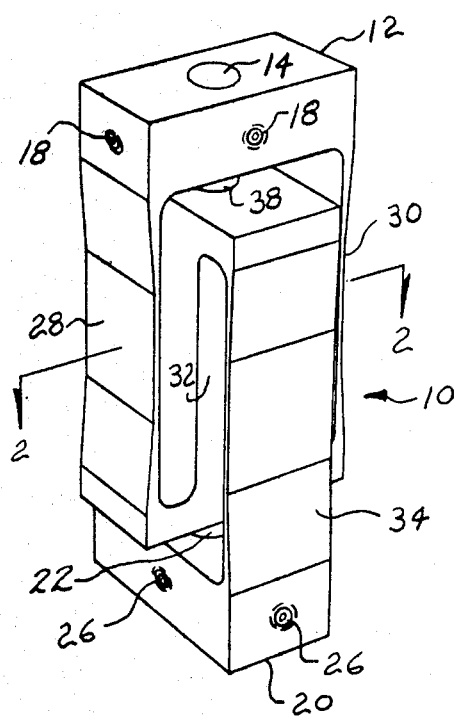
FIG. 1 shows a perspective view of the preferred embodiment of the present invention.
Figure 2:
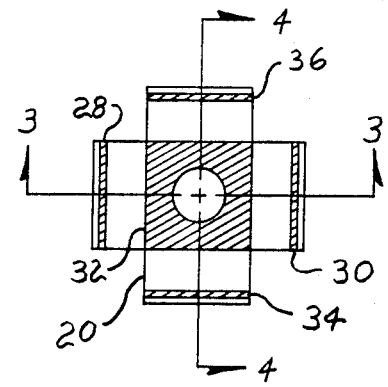
FIG. 2 shows a cross sectional view of the device of FIG. 1 through a plane perpendicular to the axis of rotation of the device.

In a like manner to that described above, there are flexible arms 34 and 36 attached to opposing faces of member 20 and to connecting member 32. Arms 34 and 36 are flexible about an axis which is orthogonal to both the axis of rotation of shaft 24 and to the axis about which arms 28 and 30 are flexible. Thus member 20 can shift laterally with respect to connecting member 32 along an axis that is perpendicular to the axis along which member 12 can shift. It can be seen by comparing FIGS. 3 and 4 that when arms 28 and 30 bend to allow member 12 to shift, arms 34 and 36 are unaffected. Because members 12 and 20 are each connected to connecting member 32 by equal length arms, the coupling device resists angular misalignment between shafts 16 and 24 and only permits radial misalignment.

Connecting member 32 serves to transmit both torque and thrust from arms 28 and 30 to arms 34 and 36, and vice versa. By locating this member between the arms, coupling device 10 is made relatively compact while allowing the arms to be of sufficient length to provide the desired degree of flexibility. The connecting member itself is rigid.

In the drawings the arms have been shown with a tapered thickness that decreases toward the center portion of each arm. This taper corresponds approximately to the bending moment distribution in the arm, thereby keeping the stress distribution in the arms approximately constant. The arms may, however, be made constant in thickness if desired for convenience in manufacturing.

As illustrated, the coupling device is made out of a single piece of material by a process such as milling. A hole 38 that is concentric with holes 14 and 22 is shown through connecting member 32. While this hole is not necessary to the operation of the coupling device, it facilitates the manufacturing of the device from a single piece of material.

It is preferable to make the coupling device out of a single piece of material since it facilitates maintenance free operation; but it is not necessary. Members 12 and 20 and connecting member 32 could each be separate pieces, as could each of the arms. In that case the arms would be mechanically fastened to the respective members, such as by screws.

It will be appreciated by those of skill in the art that variations in the described preferred embodiment without departing from the spirit of the invention. For example, the shapes of components such as members 12 and 20 can be changed in a number of ways without affecting the essential function of those members. Members 12 and 20 could be square rather than rectangular in cross section or any number of other shapes suited to the particular application.

I claim:

1. A shaft coupler for coupling rotational motion from a first shaft to a second parallel shaft while permitting relative movement of the shafts along axes orthogonal to the longitudinal axes of the shafts, the coupler comprising:
   first and second shaft attachment means for attaching the coupler to the first and second shafts;
   a first pair of parallel arms attached to the first shaft attachment means and bendable about a first axis orthogonal to the longitudinal axes of the shafts;
   a second pair of parallel arms attached to the second shaft attachment means and bendable about a second axis orthogonal to the longitudinal axes of the shafts, said first and second axes being orthogonal; and
   a connecting member connected to the ends of the first pair of arms distant from the first attachment means and to the ends of the second pair of arms distant from the second attachment means, the connecting member being situated between the first and second pairs of arms.

2. A shaft coupler as in claim 1 wherein each arm has a rectangular cross section in a plane normal to the longitudinal axis of the arm, the longer sides of the rectangles of the first pair of arms being parallel to the first axis and the longer sides of the rectangles of the second pair of arms being parallel to the second axis.

3. A shaft coupler as in claim 2 wherein each of the arms has two end portions and a middle portion, each arm being tapered so that it has a greater thickness at each end portion than at the middle portion.

4. A shaft coupler as in claim 2 wherein the first and second shaft attachment means each comprise an attachment member having opposed faces to which the respective arms are attached and having a mounting hole for the respective shaft.

5. A shaft coupler as in claim 4 wherein the attachment members, the first and second pairs of arms and the connecting member are formed out of a single piece of material.

6. A shaft coupler as in claim 4 wherein the connecting member comprises an elongated rigid member with the first pair of arms being attached to a first end of the member and the second pair of arms being attached to a second opposite end of the member.

7. A shaft coupler for rotatably coupling two parallel shafts and allowing displacement of the shafts perpendicular to the axes of rotation of the shafts, the coupler comprising:
   first and second shaft attachment means for attaching the coupler to the shafts;
   first flexible support means attached to the first shaft attachment means comprising a first pair of parallel support members each of which is more compliant to bending about an axis normal to the axes of rotation of the shafts than it is about any other axis for permitting translational movement of the first shaft attachment means along a first direction substantially perpendicular to the axes of rotation of the shafts;
   second flexible support means attached to the second shaft attachment means comprising a second pair of parallel support members each of which is more compliant to bending about an axis normal to the axes of rotation of the shafts than it is about any other axis for permitting translational movement of the second shaft attachment means along a second direction substantially perpendicular to the axes of rotation of the shafts and to the first direction; and
   connecting means connected to the first and second flexible support means and being situated between the first and second flexible support means for transmitting torque from the first flexible support means to the second flexible support means.

8. A shaft coupler as in claim 7 wherein each of the support members has two end portions and a middle portion, each support member being tapered so that it has a greater thickness at each end portion than at the middle portion.

9. A shaft coupler as in claim 7 wherein:
   each support member is rectangular in cross section;
   each shaft attachment means comprises an attachment member having opposed faces, a support member being attached to each of the opposed faces, and having a hole with an axis parallel to the axes of rotation for receiving one of the shafts.

10. A shaft coupler as in claim 9 wherein the support members, the attachment members and the connecting means are all made out of a single piece of material.

11. A shaft coupler as in claim 9 wherein the connecting means comprises an elongated rigid member with the first pair of support members being attached to a first end of the member and the second pair of support members being attached to a second opposite end of the member.

* * * * *